US010141129B2

(12) United States Patent
Lee

(10) Patent No.: US 10,141,129 B2
(45) Date of Patent: Nov. 27, 2018

(54) INTERLOCK APPARATUS OF RING MAIN UNIT

(71) Applicant: LSIS CO., LTD., Anyang-si, Gyeonggi-do (KR)

(72) Inventor: Dongsik Lee, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 14 days.

(21) Appl. No.: 15/406,691

(22) Filed: Jan. 14, 2017

(65) Prior Publication Data

US 2017/0213661 A1 Jul. 27, 2017

(30) Foreign Application Priority Data

Jan. 21, 2016 (KR) ........................ 10-2016-0007693

(51) Int. Cl.

*H01M 10/48* (2006.01)
*H01H 9/26* (2006.01)
*H01H 3/08* (2006.01)

(52) U.S. Cl.

CPC ................ *H01H 9/26* (2013.01); *H01H 3/08* (2013.01); *H01H 2239/03* (2013.01)

(58) Field of Classification Search

CPC ........ H01H 9/26; H01H 3/08; H01H 2239/03; H01H 3/02; H01H 3/00; H01H 3/161
USPC ...................................................... 200/50.34
See application file for complete search history.

(56) References Cited

U.S. PATENT DOCUMENTS

| | | | |
|---|---|---|---|
| 6,521,849 | B1 | 2/2003 | Flegel |
| 6,563,063 | B1 | 5/2003 | Moore |

FOREIGN PATENT DOCUMENTS

| | | | |
|---|---|---|---|
| CN | 201156480 | | 11/2008 |
| CN | 101557080 | | 10/2009 |
| CN | 102484002 | A | 5/2012 |
| CN | 204332752 | | 5/2015 |
| CN | 105161336 | A | 12/2015 |
| EP | 1150316 | | 10/2001 |
| JP | S62175635 | | 11/1987 |
| JP | H02030019 | | 1/1990 |
| JP | H04248214 | | 9/1992 |
| JP | H1055728 | A | 2/1998 |
| JP | 2000331574 | | 11/2000 |
| KR | 1019960025893 | | 7/1996 |
| KR | 20040033396 | | 4/2004 |
| KR | 2020130003512 | | 6/2013 |
| KR | 2020140005908 | | 11/2014 |

(Continued)

OTHER PUBLICATIONS

Japanese Office Action for related Japanese Application No. 2016-219022; action dated Oct. 31, 2017; (2 pages).

(Continued)

*Primary Examiner* — Anthony R. Jimenez
(74) *Attorney, Agent, or Firm* — K&L Gates LLP

(57) ABSTRACT

An interlock apparatus of a ring main unit is provided. The interlock apparatus may be provided between a plurality of switches which are included in the ring main unit and are adjacent to each other, and when one switch is controlled to a closed state and is connected to a power supply source, the other switch adjacent to the one switch is prevented from being connected to the power supply source, thereby preventing the plurality of switches from being simultaneously connected to the power supply source.

11 Claims, 4 Drawing Sheets

(56) References Cited

FOREIGN PATENT DOCUMENTS

| | | |
|---|---|---|
| WO | 2011020506 | 2/2011 |

OTHER PUBLICATIONS

Korean Intellectual Property Office Application No. 10-2016-0007693, Office Action dated Feb. 27, 2017, 6 pages.
European Patent Office Application Serial No. 16194388.1, Search Report dated Jan. 5, 2017, 7 pages.
Korean Intellectual Property Office Application No. 10-2016-0007693, Search Report dated Jan. 21, 2016, 5 pages.
Japanese Notice of Allowance for related Japanese Application No. 2016-219022; action dated May 8, 2018; (1 page).
Chinese Office Action for related Chinese Application No. 201710038190.X; action dated May 18, 2018; (9 pages).

INTERLOCK APPARATUS OF RING MAIN UNIT

CROSS-REFERENCE TO RELATED APPLICATION

Pursuant to 35 U.S.C. § 119(a), this application claims the benefit of an earlier filing date and right of priority to Korean Application No. 10-2016-0007693, filed on Jan. 21, 2016, the contents of which are all hereby incorporated by reference herein in its entirety.

BACKGROUND OF THE DISCLOSURE

1. Field of the Disclosure

The present disclosure relates to an interlock apparatus of a ring main unit, and particularly, to an interlock apparatus of a ring main unit, which controls a state between a plurality of switches disposed adjacent to each other.

2. Background of the Disclosure

Generally, a ring main unit is an apparatus that is used for monitoring, controlling, and protecting an electric system used to receive and distribute power supplied from power distribution equipment. The ring main unit is configured with an array where a circuit breaker, a switchgear, a ground, conductors, and the like are included in a structure sealed and insulated by an $SF_6$ gas.

The ring main unit includes a circuit breaker, a load switch, a fuse, a disconnector, etc. A cable cover is detachably attached on the ring main unit, for protecting each of circuits.

FIG. 1 is a diagram illustrating a schematic configuration of a plurality of switches 11 and 12 included in a related art ring main unit.

As illustrated in FIG. 1, the plurality of switches 11 and 12 included in the related art ring main unit are supplied with power from different power supply sources. One switch 11 is continuously connected to a power supply source, and another switch 12 disposed adjacent thereto is not connected to a power supply source so as to prevent an accident from occurring.

However, the switches 11 and 12 of the related art ring main unit configured as described above do not include a separate interlock apparatus that prevents a power supply source from being connected to all of the switches 11 and 12 disposed adjacent to each other, and consequently, all of the switches 11 and 12 are respectively connected to the different power supply sources. For this reason, the insulation performance of the ring main unit is degraded due to a potential difference caused by the double supply of powers having different phase differences, and a short circuit accident occurs frequently.

SUMMARY OF THE DISCLOSURE

Therefore, an aspect of the detailed description is to provide an interlock apparatus of a ring main unit, which controls a state between a plurality of switches disposed adjacent to each other.

To achieve these and other advantages and in accordance with the purpose of this specification, as embodied and broadly described herein, an interlock apparatus of a ring main unit, including two or more switches where a plurality of insertion holes into which a handle is inserted are respectively provided for controlling a closed or cutoff state, includes: a plate disposed in front of each of the plurality of insertion holes, wherein when one of the plurality of insertion holes is opened, the plate moves so that another insertion hole is closed; an indicator provided in each of the two or more switches, wherein the indicator rotates by controlling a closed or cutoff state of each of the two or more switches; and a movement prevention member provided in each of the two or more switches to prevent a movement of the plate according to a rotation of the indicator, thereby maintaining an open state of the one insertion hole and a closed state of the other insertion hole.

Moreover, in a state where the plate is located so that the one insertion hole is opened and the other insertion hole is closed, when each of the two or more switches is controlled to a closed state, the movement prevention member may move according to a rotation of the indicator and may be fitted into the plate to prevent a movement of the plate, thereby maintaining an open state of the one insertion hole 310 and a closed state of the other insertion hole.

Moreover, the interlock apparatus may further include first and guide members providing a movement path with the plate being fitted thereinto.

Moreover, the interlock apparatus may further include: a first guide groove provided in each of both sides of the first guide member so that the plate moves with being fitted into the first guide groove; and a second guide groove provided in the second guide member so that the plate moves with being fitted into the second guide groove.

Moreover, the interlock apparatus may further include: a knob part provided in the plate; and a movement hole provided in the first guide member so that the knob part moves, wherein by moving the knob part through the movement hole, the plate moves to open or close each of the plurality of insertion holes.

Moreover, the interlock apparatus may further include a fixing member, wherein the movement prevention member is fitted into the fixing member and moves upward and downward.

Moreover, the fixing member may include: an upper plate where an upper plate through hole through which the movement prevention member passes is provided; a middle plate provided to extend from one end of the upper plate to a lower side; and a lower plate provided to extend from one end of the middle plate in parallel with the upper plate, wherein a lower plate through hole through which the movement prevention member passes is provided in the lower plate.

Moreover, the movement prevention member may include an inclined portion provided to be inclined and a body and a body provided to extend to under the inclined portion and disposed to pass through the upper plate through hole and the lower plate through hole. Also, a pin part may be provided in the indicator and may be disposed adjacent to the inclined portion. Also, when the indicator rotates, the pin part may push the inclined portion, and the body may be fitted into the plate.

Moreover, the interlock apparatus may further include an elastic member provided between the upper plate and the lower plate and fitted into the body.

Moreover, the interlock apparatus may further include a plurality of fitting grooves into which the body is fitted, wherein in a state where the plate moves so that the one insertion hole is opened and the other insertion hole is closed, the body may be fitted into at least one of the plurality of fitting grooves, thereby maintaining an open or closed state of each of the plurality of insertion holes.

Moreover, the interlock apparatus may further include an open hole provided in the plate, wherein when the body is fitted into at least one of the plurality of fitting grooves and a movement of the plate is blocked, the one insertion hole may be opened according to the open hole being located in front of the one insertion hole, and simultaneously, the other insertion hole may be closed according to one end of the plate being located in front of the other insertion hole.

As described above, according to the embodiments of the present invention, the interlock apparatus may be provided between the plurality of switches which are included in the ring main unit and are adjacent to each other, and when the one switch is controlled to a closed state and is connected to a power supply source, the other switch adjacent to the one switch is prevented from being connected to the power supply source, thereby preventing the plurality of switches from being simultaneously connected to the power supply source.

Moreover, only one switch may be connected to the power supply source through the interlock apparatus, thereby effectively preventing the degradation of the insulation performance of the ring main unit and a short circuit accident which occur when the plurality of switches are connected to the power supply source.

Moreover, since the plurality of switches are mechanically and simultaneously connected to the power supply source through the interlock apparatus, the plurality of switches are prevented from being simultaneously connected to the power supply source due to an error which is caused by a user in a case of using a locking apparatus.

Moreover, since the interlock apparatus includes the first guide member and the second guide member, the plate may move through the first guide member and the second guide member to allow each of the insertion holes to be opened or closed, and thus, states of the switches are easily controlled.

Moreover, since the knob part is provided in the plate, the plate may move through the knob part, and thus, the plate moves easily.

Moreover, since the movement prevention member includes the elastic member, the movement prevention member easily moves through the elastic member.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an interlock apparatus of a ring main unit according to an embodiment of the present invention will be described in detail with reference to the accompanying drawings.

Figure 1:
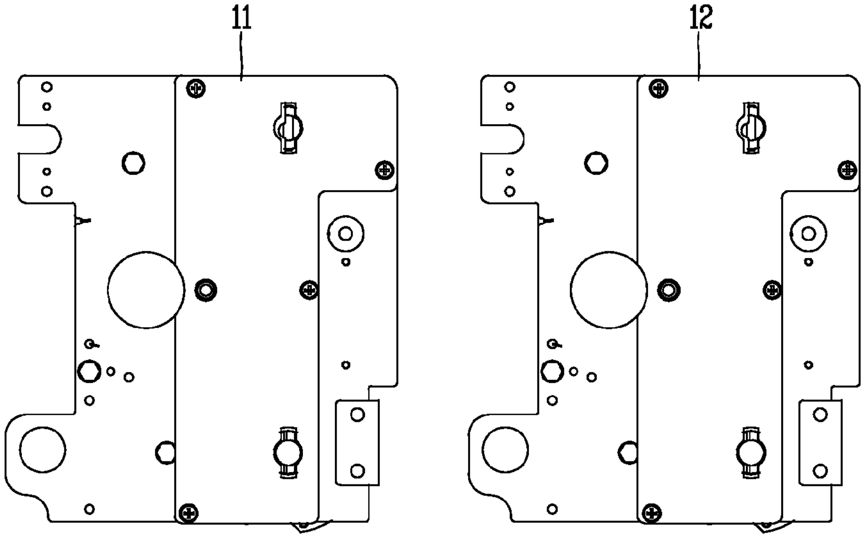
FIG. 1 RELATED ART
FIG. 1 is a diagram illustrating a schematic configuration of a plurality of switches included in a related art ring main unit.
Figure 2:
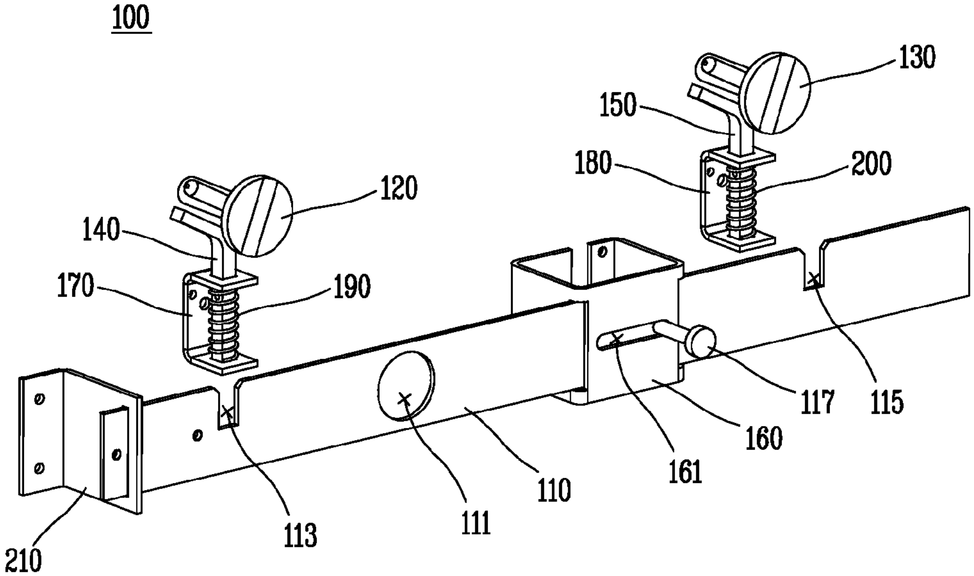
FIG. 2 is a perspective view illustrating an interlock apparatus included in a ring main unit according to an embodiment of the present invention.
Figure 3:
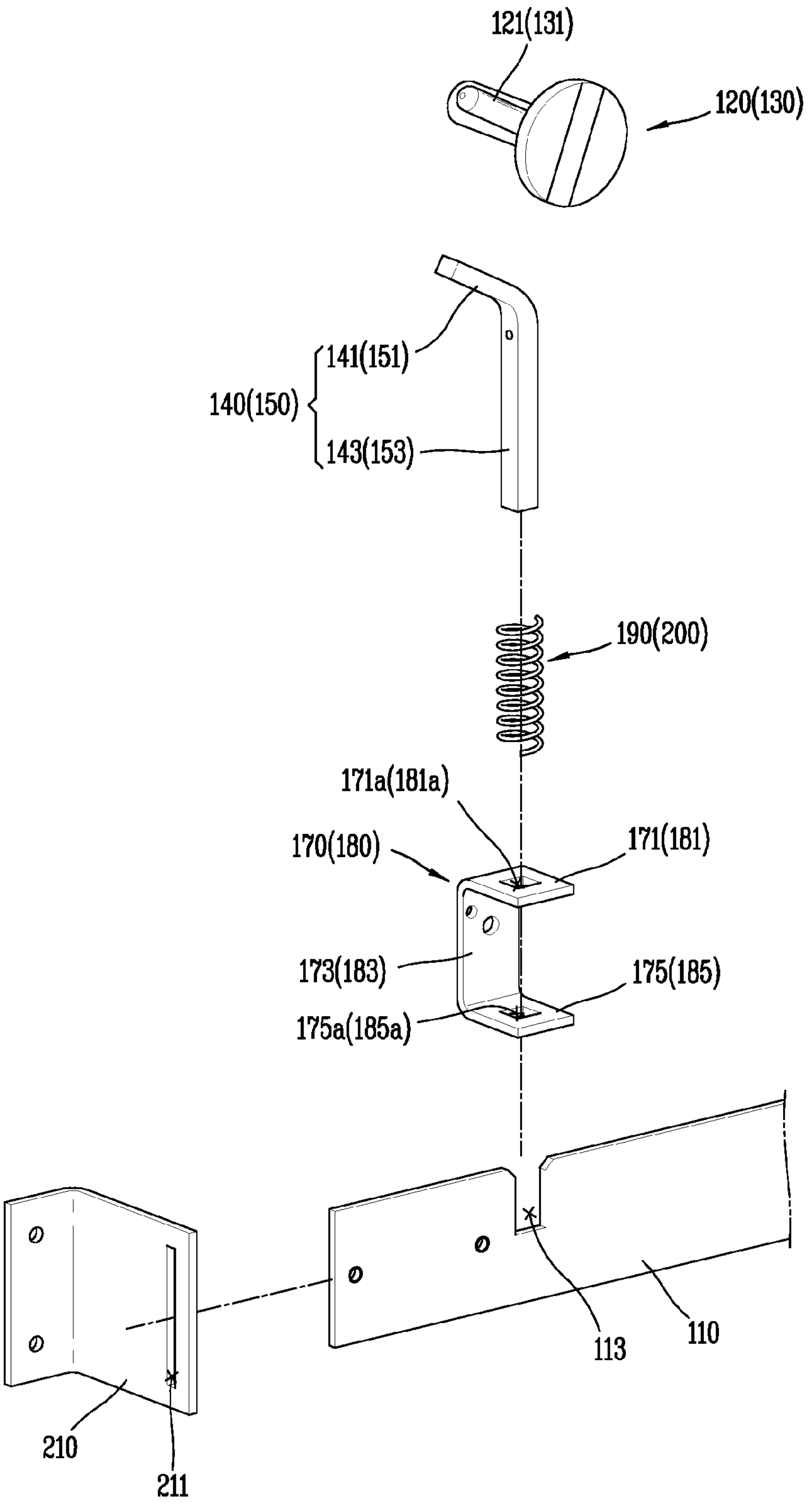
FIG. 3 is an exploded perspective view illustrating an interlock apparatus included in a ring main unit according to an embodiment of the present invention.
Figure 4:
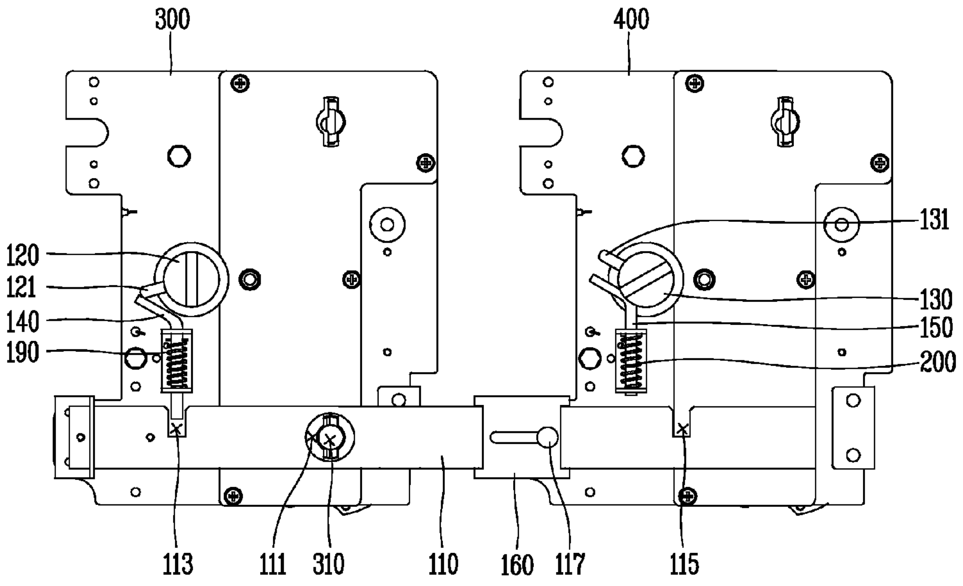
FIG. 4 is a front view of an interlock apparatus included in a ring main unit according to an embodiment of the present invention, which is controlled so that one switch is put in a closed state, and another switch is put in a cutoff state.
Figure 5:
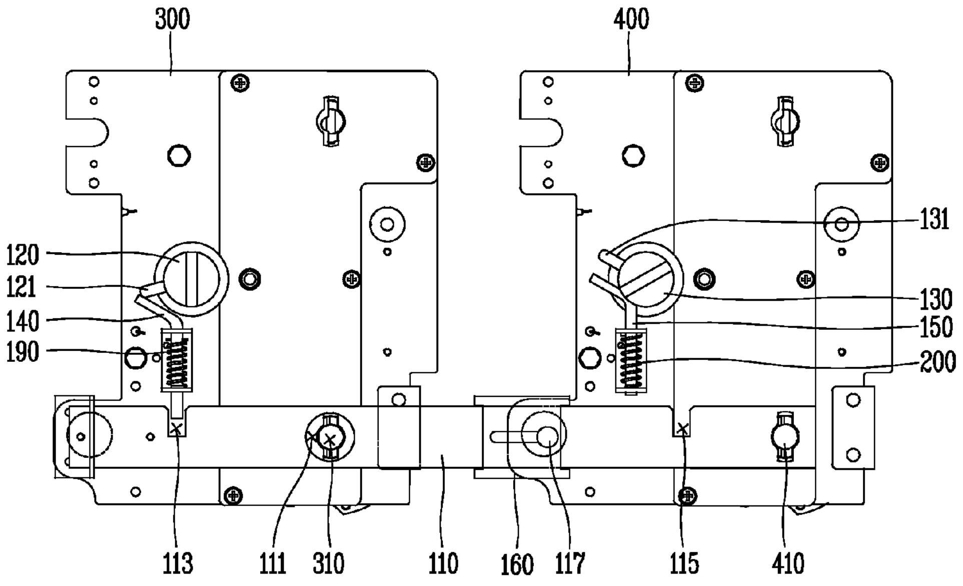
FIG. 5 is a front perspective view of an interlock apparatus included in a ring main unit according to an embodiment of the present invention, which is controlled so that one switch is put in a closed state, and another switch is put in a cutoff state.
Figure 6:
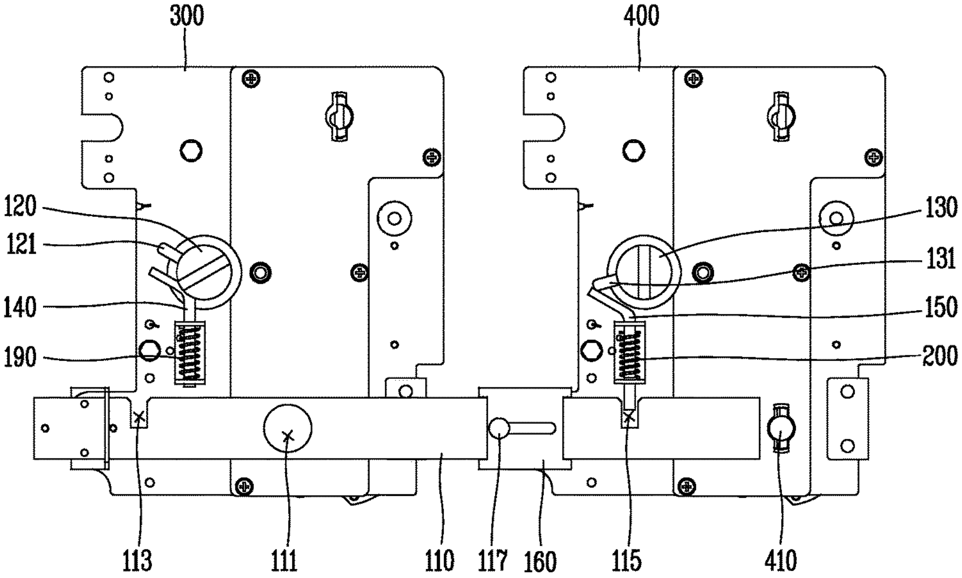
FIG. 6 is a front view of an interlock apparatus included in a ring main unit according to an embodiment of the present invention, which is controlled so that one switch is put in a cutoff state, and another switch is put in a closed state.
Figure 7:
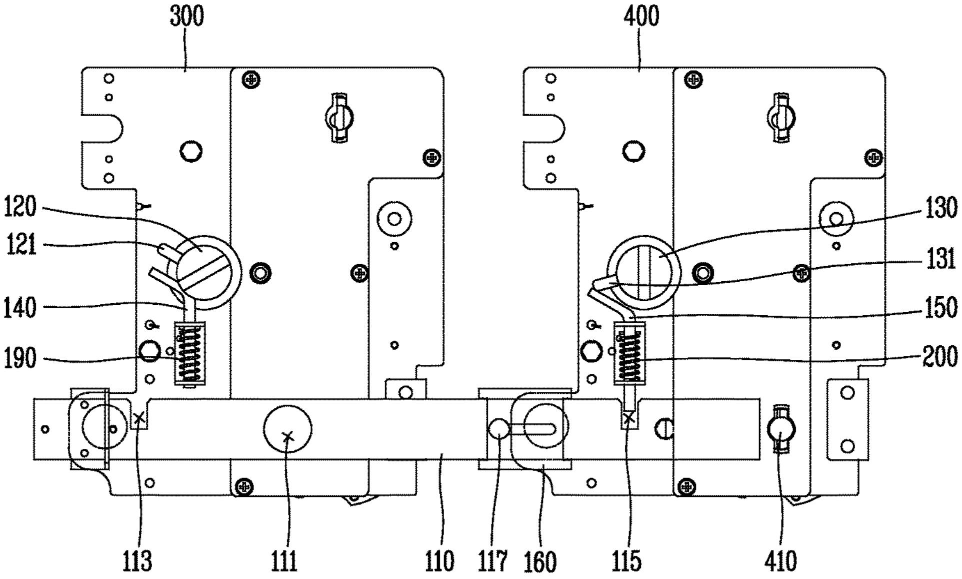
FIG. 7 is a front perspective view of an interlock apparatus included in a ring main unit according to an embodiment of the present invention, which is controlled so that one switch is put in a cutoff state, and another switch is put in a closed state.

FIG. 2 is a perspective view illustrating an interlock apparatus included in a ring main unit according to an embodiment of the present invention. FIG. 3 is an exploded perspective view illustrating an interlock apparatus included in a ring main unit according to an embodiment of the present invention. FIG. 4 is a front view of an interlock apparatus included in a ring main unit according to an embodiment of the present invention, which is controlled so that one switch is put in a closed state, and another switch is put in a cutoff state. FIG. 5 is a front perspective view of an interlock apparatus included in a ring main unit according to an embodiment of the present invention, which is controlled so that one switch is put in a closed state, and another switch is put in a cutoff state. FIG. 6 is a front view of an interlock apparatus included in a ring main unit according to an embodiment of the present invention, which is controlled so that one switch is put in a cutoff state, and another switch is put in a closed state. FIG. 7 is a front perspective view of an interlock apparatus included in a ring main unit according to an embodiment of the present invention, which is controlled so that one switch is put in a cutoff state, and another switch is put in a closed state.

As illustrated in FIGS. 2 and 3, an interlock apparatus 100 according to an embodiment of the present invention may be included in a ring main unit. The ring main unit including the interlock apparatus 100 may include two or more switches 300 and 400 including a witch 300, where an insertion hole 310 into which a handle (not shown) is inserted is provided for controlling a trip or cutoff state, and another switch 400 which is disposed adjacent to the switch 300 and where an insertion hole 410 into which the handle (not shown) is inserted is provided for controlling a closed or cutoff state.

In this case, the interlock apparatus 100 may be provided between the switches 300 and 400 so as to control states of the switches 300 and 400.

The interlock apparatus 100 may include a plate 110, a plurality of indicators 120 and 130, and a plurality of movement prevention members 140 and 150.

The plate 110 may be disposed in front of each of the insertion holes 310 and 410, and when the insertion hole 310 is opened according to a manipulation of a user, the plate 110 may move in order for the insertion hole 410 to be closed.

The indicators 120 and 130 may be coupled to a mechanism (not shown) that drives the switches 300 and 400. The indicator 120 may rotate by controlling a closed or cutoff state of the switch 300,and the indicator 130 may rotate by controlling a closed or cutoff state of the switch 400.

The movement prevention members 140 and 150 may be included in the switches 300 and 400, respectively. In a state where the insertion hole 310 is opened and the insertion hole 410 is closed through the plate 110, when the switch 300 is controlled to a closed state, the movement prevention member 140 included in the switch 300 may downward move according to a rotation of the indicator 120 and may be fitted into the plate 110 to prevent a movement of the plate 110, thereby maintaining an open state of the insertion hole 310 and a closed state of the insertion hole 410.

Moreover, in a state where the insertion hole 310 is closed and the insertion hole 410 is opened through the plate 110, when the switch 400 is controlled to a closed state, the movement prevention member 150 included in the switch 400 may downward move according to a rotation of the indicator 130 and may be fitted into the plate 110 to prevent a movement of the plate 110, thereby maintaining a closed state of the insertion hole 310 and an open state of the insertion hole 410.

In this case, the interlock apparatus 100 may further include a first guide member 160. In a state where the plate 110 is fitted into the first guide member 160, the first guide member 160 may provide a movement path for enabling the plate 110 to move.

Moreover, a first guide groove 163 may be provided in each of both sides of the first guide member 160 in order for the plate 110 to move with being fitted into the first guide groove 163. In a state where the plate 110 is located to pass through the first guide groove 163, the plate 110 may move according to a manipulation of the user, thereby controlling each of the insertion holes 310 and 410 to an open or closed state.

In addition, a knob part 117 may be provided in the plate 110, and a movement hole 161 may be provided in the first guide member 160 in order for the knob part 117 to move. When the plate 110 moves according to a manipulation of the user, the knob part 117 may move through the movement hole 161, the plate 110 may move to open or close each of the insertion holes 310 and 410.

Furthermore, the interlock apparatus 100 may further include a second guide member 210 that guides the plate 110 with the plate 110 being fitted into the second guide member 210.

In this case, a second guide groove 211 may be provided in the second guide member 210, and the plate 110 may move according to a manipulation of the user with being fitted into each of the first guide groove 163 and the second guide groove 211.

The movement prevention member 140 may be fitted into a fixing member 170 and may move upward and downward, and the movement prevention member 150 may be fitted into a fixing member 180 and may move upward and downward. In this case, the fixing member 170 may include an upper plate 171, a middle plate 173, and a lower plate 175, and the fixing member 180 may include an upper plate 181, a middle plate 183, and a lower plate 185.

An upper plate through hole 171*a* may be provided in the upper plate 171 and may allow the movement prevention member 140 to be located in a state of passing through the upper plate through hole 171*a*. An upper plate through hole 181*a* may be provided in the upper plate 181 and may allow the movement prevention member 150 to be located in a state of passing through the upper plate through hole 181*a*.

The middle plate 173 may be provided to extend from one end of the upper plate 171 to a lower side, and the middle plate 183 may be provided to extend from one end of the upper plate 181 to a lower side.

The lower plate 175 may be provided to extend from one end of the middle plate 173 in parallel with the upper plate 171, and the lower plate 185 may be provided to extend from one end of the middle plate 183 in parallel with the upper plate 181. A lower plate through hole 175*a* may be provided in order for the movement prevention member 140 to pass through the lower plate through hole 175*a*, and a lower plate through hole 185*a* may be provided in order for the movement prevention member 150 to pass through the lower plate through hole 185*a*.

Therefore, in a state where the movement prevention member 140 is located to pass through the upper plate through hole 171*a* and the lower plate through hole 175*a*, the movement prevention member 140 may downward move with a force supplied through the indicator 120, and in a state where the movement prevention member 150 is located to pass through the upper plate through hole 181*a* and the lower plate through hole 185*a*, the movement prevention member 150 may downward move with a force supplied through the indicator 130.

The movement prevention member 140 may include an inclined portion 141 and a body 143, and the movement prevention member 150 may include an inclined portion 151 and a body 153. The inclined portion 141 may be disposed adjacent to the indicator 120 and may be inclined, and the inclined portion 151 may be disposed adjacent to the indicator 130 and may be inclined. The body 143 may be provided to extend to under the inclined portion 141 and may be located to pass through the upper plate through hole 171*a* and the lower plate through hole 175*a*, and the body 153 may be provided to extend to under the inclined portion 151 and may be located to pass through the upper plate through hole 181*a* and the lower plate through hole 185*a*.

Moreover, a pin part 121 may be provided in the indicator 120 and may be disposed adjacent to the inclined portion 141, and a pin part 131 may be provided in the indicator 130 and may be disposed adjacent to the inclined portion 151. When the indicator 120 rotates according to a closing operation of the switch 300, the pin part 121 may push the inclined portion 141, and thus, the body 143 may downward move and may be fitted into the plate 110. When the indicator 130 rotates according to a closing operation of the switch 400, the pin part 131 may push the inclined portion 151, and thus, the body 153 may downward move and may be fitted into the plate 110.

In this case, an elastic member 190 may be provided between the upper plate 171 and the lower plate 175 and may be fitted into the body 143, and an elastic member 200 may be provided between the upper plate 181 and the lower plate 185 and may be fitted into the body 153. In a state where the movement prevention member 140 downward moves through the elastic member 190, when the indicator 120 rotates in a reverse direction, the movement prevention member 140 easily returns to an original position with an elastic force of the elastic member 190, and in a state where the movement prevention member 150 downward moves through the elastic member 200, when the indicator 130 rotates in a reverse direction, the movement prevention member 150 easily returns to an original position with an elastic force of the elastic member 200.

A plurality of fitting grooves 113 and 115 into which the bodies 143 and 153 are respectively fitted may be provided in an upper end of the plate 110. If the body 143 (153) is fitted into the fitting groove 113 (115) and thus a movement of the plate 110 is blocked, the plate 110 may be located so that the insertion hole 310 is opened and the insertion hole 410 is closed, or may be located so that the insertion hole 310 is closed and the insertion hole 410 is opened.

In addition, an open hole 111 may be provided in the plate 110. When the body 143 (153) is fitted into the fitting groove 113 (115) and thus a movement of the plate 110 is blocked, the insertion hole 310 may be opened according to the open hole 111 being located in front of the insertion hole 310, and simultaneously, the insertion hole 410 may be closed according to one end of the plate 110 being located in front of the insertion hole 410.

Hereinafter, a process of controlling states of the plurality of switches 300 and 400 by using the interlock apparatus 100 of the ring main unit according to an embodiment of the present invention will be described in detail with reference to FIGS. 4 to 7.

First, as illustrated in FIGS. 4 and 5, in a state where one the switch 300 and the other switch 400 are not connected to a power supply source, the user may move the plate 110 by using the knob part 117 so that one insertion hole 310 is opened, and the other switch 410 is closed.

At this time, the open hole 111 may be located in front of the insertion hole 310, the insertion hole 310 may be opened, and thus, by inserting a handle into the insertion hole 310, the switch 300 may be controlled to a closed or cutoff state. Also, the insertion hole 410 may be closed through the plate 110, and thus, the handle cannot be inserted into the insertion hole 410, whereby it is unable to control the switch 400 to a closed or cutoff state.

In this state, the handle may be inserted into the one insertion hole 310, and when the handle rotates in order for the switch 300 to be put in a closed state, a mechanism included in the switch 300 may operate, whereby the indicator 120 coupled to the mechanism rotates in cooperation with the mechanism to allow the movement prevention member 140 to be pushed to a lower side through the pin part 121.

When the movement prevention member 140 moves to the lower side, the movement prevention member 140 may be fitted into the fitting groove 113, thereby preventing a movement of the plate 110.

Therefore, since a movement of the plate 110 is prevented, a closed state of the other insertion hole 410 cannot be changed through the plate 110, and thus, it is unable to control the switch 400 to a closed state through the other insertion hole 410.

Subsequently, as illustrated in FIGS. 6 and 7, by controlling the switch 300 to a cutoff state, the movement prevention member 140 may return to an original position, and then, the user may move the plate 110 by using the knob part 117 so that the one insertion hole 310 is closed, and the other insertion hole 410 is opened.

Subsequently, the handle may be inserted into the insertion hole 410, and when the switch 400 is controlled to a closed state by rotating the handle, the indicator 130 may rotate in cooperation with each mechanism of the switch 400, and simultaneously, the pin part 131 may downward push the movement prevention member 150, whereby the movement prevention member 150 may be fitted into the plate 110.

When the movement prevention member 150 is fitted into the fitting groove 115, a movement of the plate 110 is prevented, and thus, a closed state of the insertion hole 310 cannot be changed. Accordingly, when the switch 400 is in a closed state, it is unable to control the switch 300 adjacent to the switch 400 to a closed state.

As described above, according to the embodiments of the present invention, the interlock apparatus 100 may be provided between the plurality of switches 300 and 400 which are included in the ring main unit and are adjacent to each other, and when the one switch 300 is controlled to a closed state and is connected to a power supply source, the other switch 400 adjacent to the one switch 300 is prevented from being connected to the power supply source, thereby preventing the plurality of switches 300 and 400 from being simultaneously connected to the power supply source.

Moreover, only one switch may be connected to the power supply source through the interlock apparatus 100, thereby effectively preventing the degradation of the insulation performance of the ring main unit and a short circuit accident which occur when the plurality of switches 300 and 400 are connected to the power supply source.

Moreover, since the plurality of switches 300 and 400 are mechanically and simultaneously connected to the power supply source through the interlock apparatus 100, the plurality of switches are prevented from being simultaneously connected to the power supply source due to an error which is caused by a user in a case of using a locking apparatus.

Moreover, since the interlock apparatus 100 includes the first guide member 160 and the second guide member 210, the plate 110 may move through the first guide member 160 and the second guide member 210 to allow each of the insertion holes 310 and 410 to be opened or closed, and thus, states of the switches 300 and 400 are easily controlled.

Moreover, since the knob part 117 is provided in the plate 110, the plate 110 may move through the knob part 117, and thus, the plate 100 moves easily.

Moreover, since the movement prevention member 140 (150) includes the elastic member 190 (200), the movement prevention member 150 easily moves through the elastic member 190 (200).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An interlock apparatus of a ring main unit including two or more switches where a plurality of insertion holes into which a handle can be inserted are respectively provided for controlling a closed or cutoff state, the interlock apparatus comprising:

a plate disposed in front of each of the plurality of insertion holes, wherein when one of the plurality of insertion holes is opened, the plate moves so that another insertion hole is closed, a plurality of fitting grooves formed in an upper end of the plate;

an indicator provided in each of the two or more switches, wherein the indicator rotates by controlling a closed or cutoff state of each of the two or more switches; and a movement prevention member provided in each of the two or more switches to prevent a movement of the plate, wherein when one of the switches is in a closed state, the movement prevention member is inserted into one of the plurality of fitting grooves according to a rotation of the indicator, thereby maintaining an open state of the one insertion hole and a closed state of the other insertion hole.

2. The interlock apparatus of claim 1, wherein in a state where the plate is located so that the one insertion hole is opened and the other insertion hole is closed, when each of the two or more switches is controlled to a closed state, the movement prevention member moves according to a rotation of the indicator and is fitted into the plate to prevent a movement of the plate, thereby maintaining an open state of the one insertion hole and a closed state of the other insertion hole.

3. The interlock apparatus of claim 1, further comprising: first and second guide members providing a movement path with the plate being fitted thereinto.

4. The interlock apparatus of claim 3, further comprising:

a first guide groove provided in each of both sides of the first guide member so that the plate moves with being fitted into the first guide groove; and a second guide groove provided in the second guide member so that the plate moves with being fitted into the second guide groove.

5. The interlock apparatus of claim 4, further comprising:

a knob part provided in the plate; and a movement hole provided in the first guide member so that the knob part moves, wherein by moving the knob part through the movement hole, the plate moves to open or close each of the plurality of insertion holes.

6. The interlock apparatus of claim 1, further comprising: a fixing member, wherein the movement prevention member is fitted into the fixing member and moves upward and downward.

7. The interlock apparatus of claim 6, wherein the fixing member comprises:

an upper plate where an upper plate through hole through which the movement prevention member passes is provided;

a middle plate provided to extend from one end of the upper plate to a lower side; and a lower plate provided to extend from one end of the middle plate in parallel with the upper plate, wherein a lower plate through hole through which the movement prevention member passes is provided in the lower plate.

8. The interlock apparatus of claim 7, wherein the movement prevention member comprises an inclined portion provided to be inclined and a body provided to extend to under the inclined portion and disposed to pass through the upper plate through hole and the lower plate through hole, a pin part is provided in the indicator and is disposed adjacent to the inclined portion, and when the indicator rotates, the pin part pushes the inclined portion, and the body is fitted into the plate.

9. The interlock apparatus of claim 8, further comprising: an elastic member provided between the upper plate and the lower plate and fitted into the body.

10. The interlock apparatus of claim 8, wherein in a state where the plate moves so that the one insertion hole is opened and the other insertion hole is closed, the body is fitted into at least one of the plurality of fitting grooves, thereby maintaining an open or closed state of each of the plurality of insertion holes.

11. The interlock apparatus of claim 10, further comprising: an open hole provided in the plate, wherein when the body is fitted into at least one of the plurality of fitting grooves and a movement of the plate is blocked, the one insertion hole is opened according to the open hole being located in front of the one insertion hole, and simultaneously, the other insertion hole is closed according to one end of the plate being located in front of the other insertion hole.

* * * * *